United States Patent [19]

Pallmann

[11] Patent Number: 5,070,918
[45] Date of Patent: Dec. 10, 1991

[54] FEED DEVICE SUITABLE FOR USE WITH WOOD FLAKING MACHINES

[75] Inventor: Wilhelm Pallmann, Zweibruecken, Fed. Rep. of Germany

[73] Assignee: Pallmann Maschinenfabrik GmbH & Co. KG, Zweibruecken, Fed. Rep. of Germany

[21] Appl. No.: 519,224

[22] Filed: May 3, 1990

[30] Foreign Application Priority Data

Jul. 14, 1989 [DE] Fed. Rep. of Germany ....... 3923264

[51] Int. Cl.⁵ .......................... B27L 11/00; B27C 1/12
[52] U.S. Cl. .................................. 144/172; 144/242 R; 144/245 A; 144/245 E; 144/373; 144/180
[58] Field of Search ................. 144/162 R, 172, 174, 144/176, 180, 242 R, 254 R, 245 A, 245 D, 245 E, 373; 241/92; 414/48, 417

[56] References Cited

U.S. PATENT DOCUMENTS 4,784,198 11/1988 Pallmann .............................. 144/373

Primary Examiner—W. Donald Bray
Attorney, Agent, or Firm—Foley & Lardner

[57] ABSTRACT

A device suitable for the continuous feeding of wood pieces of approximately the same length into flaking machines comprises a feed trough opening into the flaking machine, behind which there is arranged a loading magazine whose cross section agrees with the feed trough. The lengths of wood are shaped into compact piles, which are then advanced cyclically into the flaking machine by means of a pushing plate. In order to be able to bring the pushing plate back over the log pile already prepared for further processing inside the loading magazine, the pushing plate is able to be slewed upon a support that can be moved parallel to the floor of the device, over both the feed trough and the loading magazine. Control members attached to the pushing plate interact for short intervals with stationary control paths at the beginning and end of the return trip of the pushing plate to cause the plate to tip either into its withdrawal position or into its pushing position. Additionally, a sliding closer, which can be slid between the feed trough and the flaking machine, serves, during the last flaking cycle, to close the flaking chamber, and, during the preceding flaking cycles, to exert additional pressure on the log pile to be processed.

17 Claims, 3 Drawing Sheets

FEED DEVICE SUITABLE FOR USE WITH WOOD FLAKING MACHINES

FIELD OF THE INVENTION

The present invention relates to a device suitable for continuously feeding to flaking machines wood pieces, more particularly, logs whose average unit length is approx. 2.5m. The normally uniform length of such logs is by and large set by the allowable loading width of the vehicles used for their transport to the mill. The length of timber felled in permanently cold climatic zones may, on the other hand, be limited by the dimensions of the thawing basins required to thaw them out prior to further processing.

1. Background of the Invention

Rationalized production of high-quality, uniform wood flakes destined for immediate conversion into high-performance intermediate products such as particle board or particle profile requires that the logs be fed in piles, properly aligned and parallel to each other, in uniform, unbroken sequence, into the flaking chamber of the flaking machine, where they can be chewed into wood flakes, the fibres being parallel to the cutting direction. The feasability of this process depends on matching the length of individual log sections to the effective cutting width of the flaking machine in order to obviate the presence, when the flaking chamber has been loaded to its effective working level, of short unusable sections. The latter, which are mostly disc-shaped, slide about uncontrolled, their fibres being no longer parallel to the cutting knives. Such improper orientation of the feedstock results in an unacceptably high proportion of fines in the flake product, causes fluctuations in the power requirement of the machine and quickly wears down the flaking knives. Such economic considerations compel the search for a log feeder on flaking machines whose design and method of processing prevents the occurrence of errant, unusable log ends in the flaking chamber.

2. Prior Art

U.S. Pat. No. 4,784,198 issued to Wilhelm Pallmann on Nov. 15, 1988 discloses a feed device that in great measure satisfies such technical requirements. This prior art device consists substantially of a flow trough which, feeding into the flaking chamber of the flaking machine, runs underneath a loading magazine. The logs, fed by a transverse conveyor, are marshalled into a pile and properly oriented for subsequent flaking. When the V-shaped loading magazine floor comprising two hinged flaps falls open, the now-compact log pile drops into the flow trough whence log sections matching the cutting width of the cutting rotor are moved, by means of a cyclically driven, longitudinally pushing plate, into the flaking chamber.

A disadvantage attending this known feed device is that the arrangement of the loading magazine above the flow trough results in a system whose structural height either makes difficult or prevents entirely its installation inside existing factory buildings. In addition, after the log pile has dropped from the feed magazine into the flow trough, it is no longer possible to correct the position of the logs in order to bring them into parallel alignment.

An attempt to remedy the above deficiency resulted in the development of two further feed devices, wherein the feed magazine was arranged at the same height as and behind the flow trough. This novel disposition of the feed magazine hindered the pushing plate in its return to a starting position upstream of the log pile prepared to enter the next flaking phase.

In one of the two known feed devices, the above problem was circumvented by having the full loading magazine travel transversally to the discharge position upstream of the feed trough only after the pushing plate had assumed its starting position, an arrangement permitting the pushing plate to advance the logs out of the loading magazine into the feed trough now realigned with the latter, from whence the logs could be fed in a normal cycle into the flaking chamber.

The other prior art feed device provided for the alleviation of the aforementioned problem by means of a pushing plate specially assigned both to the feed trough of the feed station and to the loading magazine permanently located upstream of the latter. This arrangement permitted the pushing plate serving the loading magazine to advance the prepared log pile into the feed trough of the feed station whose own pushing plate, being caused by mechanical means to slew into a standby position above the trough, gave access to the latter, whereafter such pushing plate would be able to continue pushing the logs into the flaking chamber of the flaking machine.

A disadvantage common to both of the above-mentioned prior art feed devices whose loading magazine is arranged at the same height as and upstream of the feed trough of the feed station, is the requirement for separate transfer mechanisms whose drive-and-control systems operate independently of the system's actual feed assembly in order to be able to transfer the log pile from the loading magazine into the feed trough of the feeding station. This prior art system not only requires a higher installation cost, but increases system-wide vulnerability to mechanical damage because the control mechanisms fundamental to its operation are susceptible both to wear and to the incursion of dirt. In addition, the independent motive-and-control systems are susceptible to down time, a condition inimical to a continuous feeding and flaking operation.

SUMMARY OF THE INVENTION

The present invention has therefore as its object the development of a feed device whose loading magazine is permanently positioned upstream of the feed trough of the feed station, whereby the loading of both the feed trough and the loading magazine can be effected by a single transfer device whose operation, being dependent upon only a single motive system, is accomplished without the aid of mechanical control devices, an arrangement that permits the flaking process to continue without downtime. The proposed arrangement furthermore unquestionably satisfies the requirement mentioned above that unflaked leftover log sections be eliminated.

The object of the present invention is essentially satisfied by a device suitable for the continuous feed of pieces of wood that have been formed into piles, more particularly round pieces of wood being essentially of even length, said device consisting of a feed trough opening into a flaking chamber of a flaking machine, along which a pushing plate cyclically pushes into said flaking chamber sections of equal length of a pile of wood that has been formed inside a loading magazine, said loading magazine being arranged at the same height as and behind said feed trough to serve as a rear extension of said feed trough, characterised in that the pushing plate is slewably borne upon a support that can be moved back and forth both directly above the feed trough and the loading magazine and parallel to respective floor surfaces of said feed trough and said loading magazine, said pushing plate being furthermore provided with one or more guide members, which, in concert with stationary control paths, transmit, only in the starting and end zones of the return trip of said pushing plate, control pulses of short duration to said pushing plate to cause said pushing plate to slew into either a withdrawn position or a pushing position.

The bearing of the pushing plate on a support element which, being situated above both the feed trough and the loading magazine, can be reciprocally moved parallel to the base, allows the pushing plate, in the course of its return to its starting position, to be swung upwardly far enough so as to be able to move back over the pile of logs already prepared for flaking in the loading magazine whereupon such plate is moved back into position ready for pushing the logs. This concept necessitates only relatively short control impulses for the slewing motions of the pushing plate before and after return travel of such plate, and thus, as an object of the present invention stipulates, obviates the need for wear-prone mechanical control devices.

In addition, both the pushing plate and its support are able, by virtue of their base-parallel return movement directly over feed trough and loading magazine, to report process interruptions whenever the allowable height of the log pile inside the loading magazine is exceeded. Interruption of the return movement in this case would trip the signalling device and give the machine operator a chance to correct the height of the log pile prior to resumption of the log-pushing phase.

Further advantageous innovative design concepts are set out below.

For example, the pushing plate can be borne on one end of a double-armed lever, the other of whose arms bears a counterweight as well as control elements that interact for short intervals with stationary control paths, not only minimizing the control impulses required to induce slewing motion in the pushing plate, but permitting the control elements, which remain largely inactive during travel of the arms, to pass unhindered beneath the transverse conveyor that opens into the loading magazine. This arrangement is clearly demonstrated in the drawings where, in the working position of the pushing plate, such control elements are located above the transverse conveyor, and in the return travel position of such plate, below the transverse conveyor. In addition, the stationary control paths can be so designed that duration and intensity of the control impulses are optimally balanced.

The control impulses required to induce slewing motion in the pushing plate can be kept to a minimum when the relationship between the mass and disposition of the pushing plate to that of the counterweight is such that the double-armed lever system is, when occupying the midpoint in its slewing range, in an unstable equilibrium. Such is the case if the integral centre of gravity (centre of mass) of the lever system, which is positioned midway through its slewing angle, comes to rest exactly perpendicular above the slewing axis. Repositioning of the pushing plate from either its pushing position to its return travel position, or vice-versa, requires only that the integral mass of the lever system, concentrated at its centre of gravity, be shifted a predetermined distance, whereafter the pushing plate tips of its own accord into either position. The pushing plate remains in one of the latter positions, with an inherent stability corresponding to said predetermined distance during the greater portion of its path of travel, until it is again actuated by a control impulse. By optimally selecting the distance of the centre of gravity from the slewing axis of the double-armed lever system, the system designer is able to effectively balance the control impulses required to actuate the pushing plate with the stability of the latter in terminal positions.

The control path can be arranged in the downstream zone of the feed trough, whereby such control path is located on the underside of a slewably-borne control tongue acted upon by a resetting force, allowing the control member of the pushing plate to pass, during the forward feeding stage, unhindered beneath the stationary control path.

A method of redirecting the pushing plate that especially minimizes the occurrence of wear is provided if the control member of such pushing plate comprises a roller located on the side of the counterweight.

The guide arrangement for the pushing plate support can be such that the support is borne in guide tracks located on either side of both the feed trough and the loading magazine, which also contains a chain drive for its forward and backward movement, and also permits housing of its guide-and-drive elements that largely protects such elements from dirt and wear.

The sliding closer, which can be inserted between the opening end of the feed trough and the flaking chamber, satisfies the two general conditions stipulated in the objects of the present invention, which are, firstly, that of preventing the occurrence of left over log sections, and, secondly, the provision for the flaking machine of an uninterrupted operating rhythm, i.e. one in which downtimes are prevented. Because, during the last flaking cycle in which a pile of logs is being gradually fed into the flaking chamber, the condition of the latter remaining open can permit individual log sections to be pushed backwards partially into the feed trough, it has been found necessary to close the flaking chamber during the last flaking cycle. In principle, this could be achieved by leaving the pushing plate in its terminal position, but such an arrangement would require the allotment of an amount of extra time that is irreconcilable with the stipulation of a smoothly functioning flaking process that does not experience downtime. A sliding closer enables the instantaneous withdrawal of the pushing plate after the last section of a log pile has been pushed into the flaking chamber.

The sliding closer serves moreover, during the flaking of the preceding log sections, as an additional pressure element which, in concert with the opposite wall of the feed trough, is able to immobilize the logs in the immediate vicinity of the cutting rotor.

Lastly, the sliding closer acts, when in its closed position, as a stop plate for a log pile that has been newly slid into the feed trough. In this role, the sliding closer marks the starting position for the pushing plate, from which point, following opening of the sliding closer, the log pile can be fed cyclically, into the flaking chamber which has, in the meantime, returned to its flaking position.

The stopping function of the sliding closer can also be used, whenever logs of widely differing dimensions are being processed, to identify an acceptable, uniform length for the individual feed cycles. This step of the operation has been more fully disclosed in the United States patent referred to above.

BRIEF DESCRIPTION OF THE DRAWINGS

The attached drawings more fully describe a prepared embodiment of the present invention.

FIG. 5 (with FIG. 1) is an illustration of the kinematics governing the tipping of the proposed pushing plate.

DETAILED DESCRIPTION OF THE PREFERRED EMBODIMENT

Figure 1:
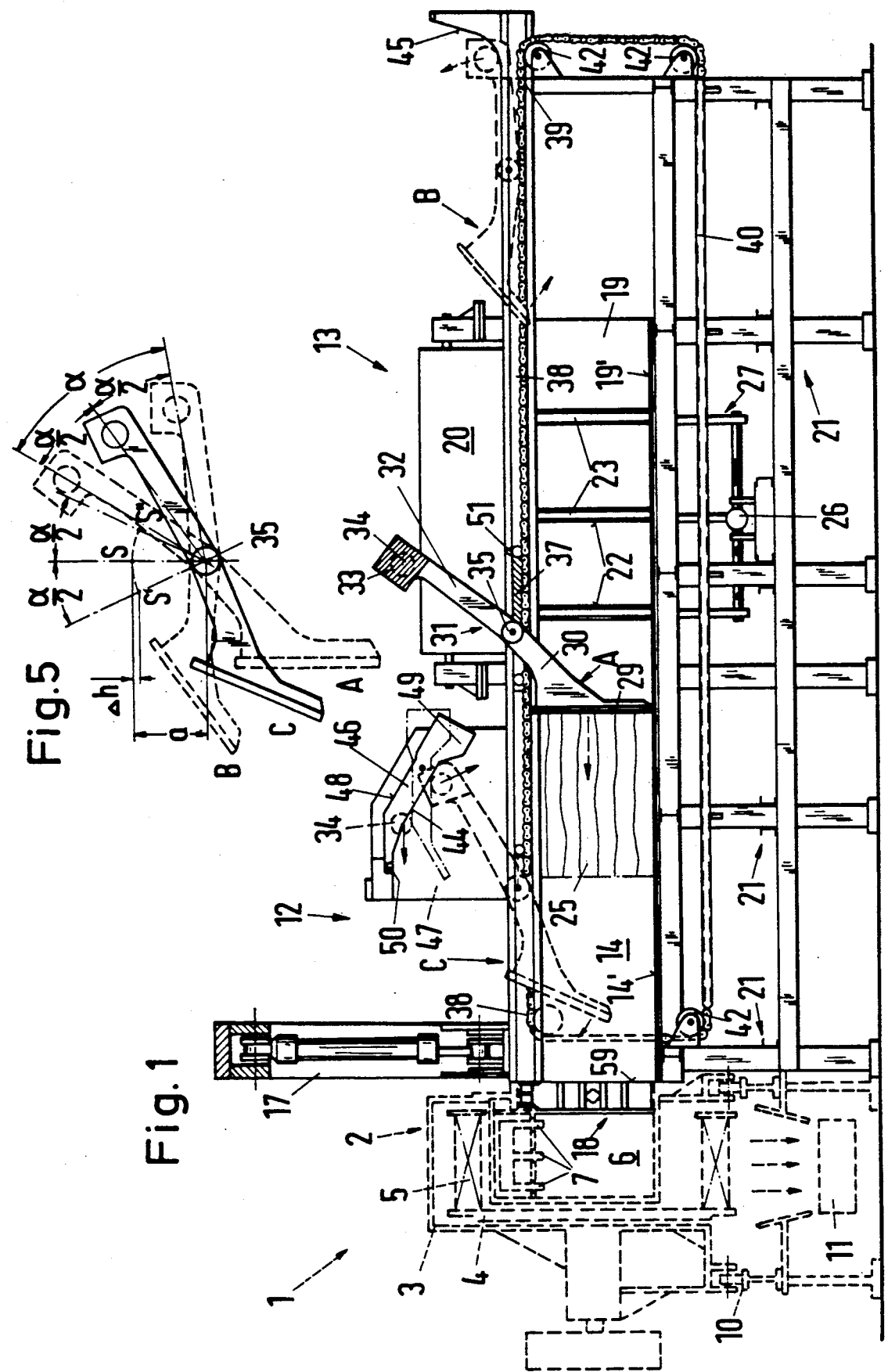
FIG. 1 is a longitudinal section through a feed device taken on the line I—I of FIG. 2.
Figure 2:
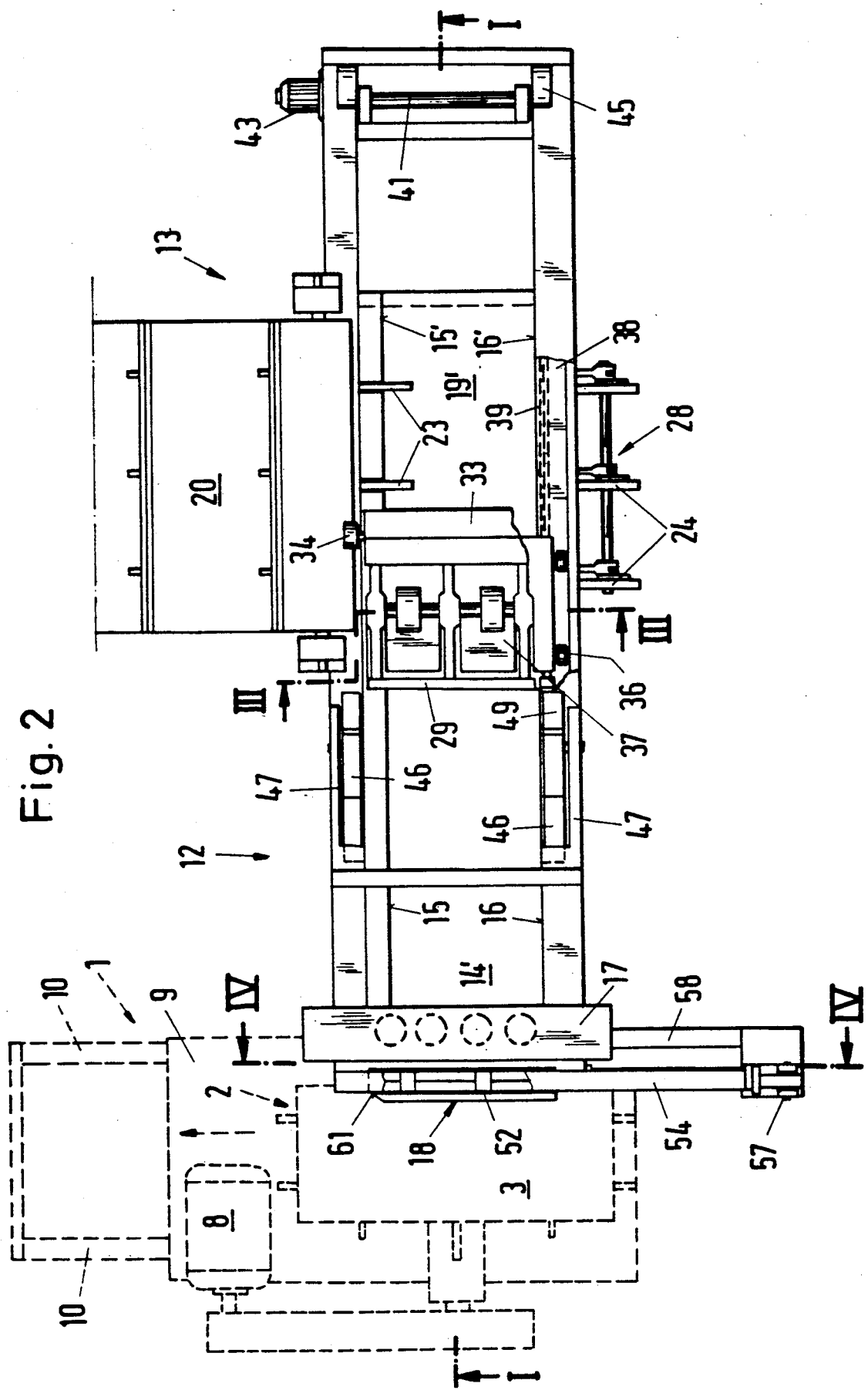
FIG. 2 is a plan view of the feed device.
Figure 3:
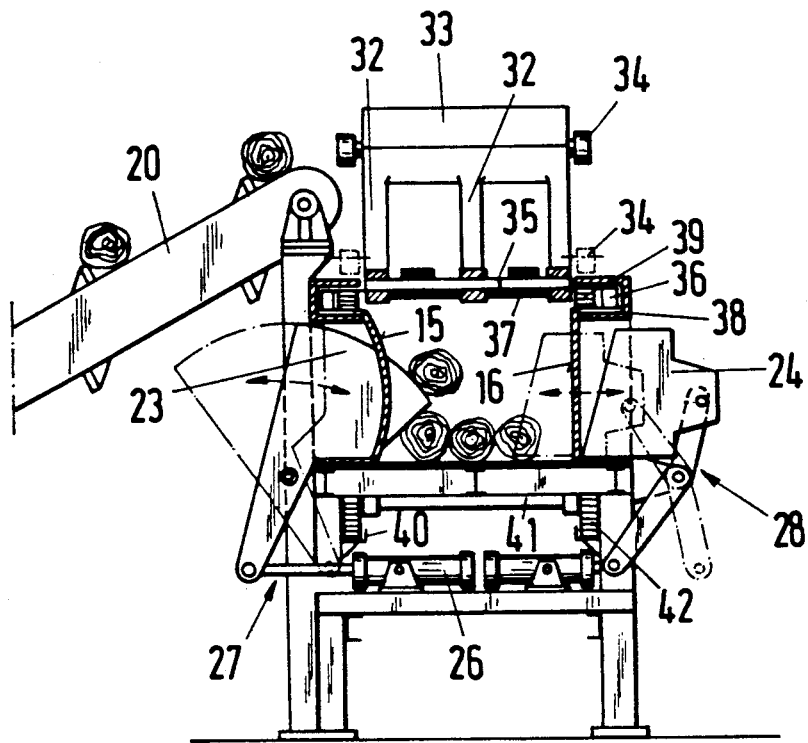
FIG. 3 is a cross section through the feed device taken on the line III—III of FIG. 2.

Flaking station 1, which in FIGS. 1 and 2 is indicated by broken lines, comprises essentially a flaking machine 2, in whose housing 3 is suspended a cutting rotor 4 to which the flaking knives are attached in the form of a ring. Knife ring 5 is enclosed by a flaking chamber 6, into which pressure elements 7 extend. Flaking machine 2 is, together with its drive motor 8, mounted on top of a platform 9 that can be slid back and forth upon tracks 10. In this arrangement, the wood sections occupying flaking chamber 6 are reduced to flakes by the movement of flaking chamber 6 in the direction indicated in FIG. 2 by the arrows, whereafter flaking chamber 6 returns quickly in the opposite direction so that it can resume its flaking function. The uniform flakes thus produced drop from housing 3 onto a conveyor belt 11, and are thereupon delivered directly to further industrial processing.

Flaking machine 2, which is indicated in rough outline and does not form part of the actual proposed invention, is a so-called knife-ring type flaker. However, the proposed design for a feed device, which shall next be disclosed in greater detail, can also be employed in conjunction with other types of flaking machines—namely the knife head or knife-disc type flaker.

The proposed feed device comprises essentially a feed station 12 and a loading station 13. The main component of feed station 12 is a feed trough 14, which, With its floor surface 14' opens into flaking chamber 6 of flaking machine 2 at the same height and features by the shape of its side walls 15, 16 a cross sectional profile substantially corresponding to the profile of the open flaking chamber 6. To this end, side wall 15 features, given respect to the special shape of the knife-ring flaker being used in the present example, a convex bulge whose curvature corresponds to the inner radius of knife ring 5. Above the discharge zone of feed trough 14 is a pressing assembly 17 which, acting from above, serves, during the individual flaking cycles, to immobilize the log pile immediately in front of flaking chamber 6. A further component of feed station 12 is a sliding closer 18 which can be slid from the side between feed trough 14 and flaking chamber 6, and is thus able to close flaking chamber 6 while the last section of a given pile is being reduced to flakes.

Loading station 13, arranged immediately behind feed station 12, comprises a loading magazine 19 and a transverse conveyor 20 feeding thereinto. Since the cross section of loading magazine 19 congrues with that of feed trough 14, the former such magazine constitutes with its lateral walls 15', 16' and floor surface 19' a rear extension of such trough. Both feed trough 14 and loading magazine 19 are mounted upon a common frame 21.

Provided in lateral walls 15', 16' of loading magazine 19 are a plurality of slots 22 into which directing-and-righting elements 23, 24 can be moved from the side into loading magazine 19. Such elements serve to marshall the logs, which have fallen from transverse conveyor 20 into loading magazine 19, into a tightly packed, parallel log pile 25. Control-and-righting elements 23, 24 can, by means of control rods 27, 28, be actuated by hydraulic assemblies 26.

A single common pushing plate 29 can be longitudinally slid along feed trough 14 of feed station 12 and loading magazine 19 of loading station 13, in order to push log pile 25, which has been formed inside loading magazine 19, firstly into feed trough 14 and from thence cyclically in uniform sections into flaking chamber 6 of flaking machine 2. In this arrangement, as has been more fully disclosed in United States patent referred to above, the individual advance cycles of the log pile can, in accordance with the longest log in a given pile, be adapted in their number and duration to the cutting width of the flaker, so that when flaking chamber 6 has been thus optimally loaded, pile sections of equal length can be processed. This prevents the occurrence, following the last flaking cycle of a given log pile, of leftover log pieces.

FIG. 1 shows pushing plate 29 in three positions, i.e. in pushing position A, and, as indicated by the broken lines, withdrawal position B and midpoint C during tipping. Pushing plate 29 is attached to three arms 30 of a double-armed lever system 31, to whose other arms 32 are attached a counterweight 33 as well as a pair of control rollers 34 arranged on either side of such counterweight. Double-armed lever system 31 is borne on a slewing axle 35, which itself sits in an essentially flat plate which, together with lateral rollers 36, form a support 37 that can be moved back and forth in guide grooves 38 that run along the top of both feed trough 14 and loading magazine 19.

Guide grooves 38 extend from feed trough 14 through loading magazine 19 and beyond. The reciprocal travel of support 37 is induced by a chain drive comprising two endless, synchronously driven lengths of chain 39, whose upper length is also housed in guide grooves 38, while the lower length slides along in chain grooves 40, which are attached to the inner side of frame 21. Redirection of both chain lengths 39 is effected by paired chain wheels 42, of which one pair, being connected together by a shaft 41, moves in concert with each other and can be driven by means of a controllable mechanical or hydraulic motor 43.

Guide rollers 34 of pushing plate 29 interact for a short time with stationary control paths 44, 45, which are, respectively, arranged in pairs on both sides of the outlet zone of feed trough 14 and at a distance behind loading magazine 19. Both control paths 44 located on top of feed trough 14 are formed by the underside of a guide tongue 46, which is slewably borne on the inner side of lateral cheeks 47, which themselves are attached to the lateral edges of feed trough 14. The upper side of both guide tongues 46 form running surfaces 48 for guide rollers 34, which, when pushing plate 29 is in the pushing position A, press down far enough so as to be able to pass unhindered in the direction in which the logs are to be fed to the flaking machine. Next, guide tongues 46, under the influence of counterweight 49 attached thereto, return to their original position, which is determined by a stop 50 located on both lateral cheeks 47. Thus repositioned, guide tongues 46 are able, after the start of the return trip of pushing plate 29, to provide the impulse for pushing plate 29 to regain its withdrawal position B. After pushing plate 29 has been swung back into its withdrawal position B, one of lever arms 32 of double-armed lever system 31, which bear counterweight 33, comes to rest upon an elastic buffer 51 attached to support 37, whereupon it is able to lie during the entire return trip of pushing plate 29.

The other stationary control path 45, located at the opposite end of the proposed feed device, at a distance from loading magazine 19, serves to cause pushing plate 29 to slew back into its pushing position A behind log pile 25, which has been prepared inside loading magazine 19.

Figure 4:
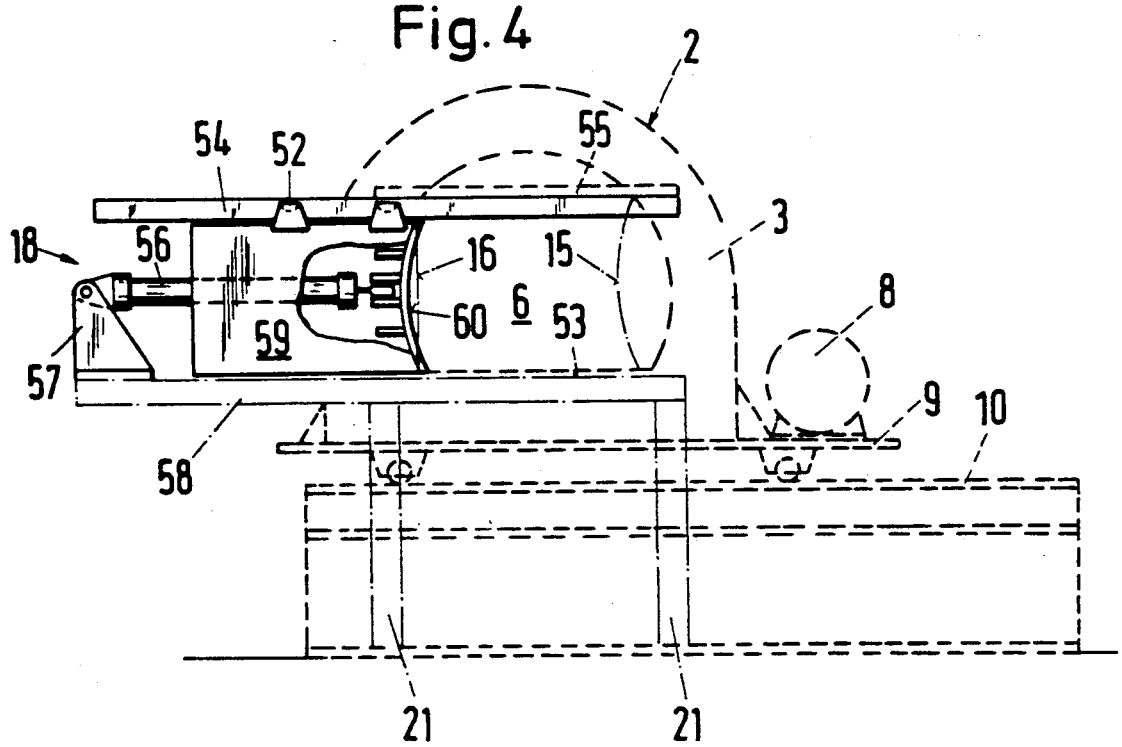
FIG. 4 is a cutaway view taken on the line IV—IV of FIG. 2.

Sliding closer 18, provided between the discharge end of feed trough 14 and flaking chamber 6, is shown in FIGS. 1 and 2 as being closed and in FIG. 4 as being open.

Sliding closer 18 is capable, after the last section of a log pile has been fed into the flaking chamber, of locking flaking chamber 6 so that pushing plate 29 can quickly regain its starting position without occasioning, during flaking of the last section of a log pile, the pushing of logs from flaking chamber 6 into feed trough 14, a condition that could lead to the creation of left over log sections and the concomitant deterioration of flake quality.

As FIG. 4 in particular demonstrates, sliding closer 18 can be slid from the side between feed trough 14 and flaking chamber 6. To this end, sliding closer 18 is suspended on track rollers 52 and is laterally guided from the bottom in a groove 53 provided in the floor of flaking chamber 6. Track rollers 52 run upon a guide rail 54 that is attached to a flange 55 that itself is horizontally attached to housing 3 of flaking machine 2. For the purposes of the intended operation, guide rail 54 follows the reciprocal movement of flaking machine 2, while sliding closer 18, which is slidably suspended thereupon, remains immobile. Sliding closer 18 is actuated rather, by means of a hydraulic system 56 borne upon a bracket bearing 57 which is itself attached to a boom 58 attached to frame 21. Immediately after the last section of any given log pile has been fed into the flaking chamber, sliding closer 18 closes flaking chamber 6. Sliding closer 18 also acts, during the preceding flaking sequences, as a pressure element, which with its reinforced frontal face 60 acts together with the opposing lateral wall 15 of feed trough 14 to hold the logs in place from the side immediately in front of the flaking chamber. Accordingly, frontal face 60 is concavely shaped to fit the convex curvature of lateral wall 15 of feed trough 14. Additionally, frontal face 60 is provided with an oblique surface 61 that faces flaking chamber 6, in order to ensure proper closing of sliding closer 18.

Sliding closer 18 in its closed condition finally serves, through its protective metal cladding 59, as a stop for log pile 25 that has been newly slid into feed trough 14. Thus, sliding closer 18 marks the point from which pushing plate 29 can begin feeding, in cycles of uniform duration, the logs into the flaking chamber. Simultaneously, the closing of sliding closer 18 sends a signal to transverse conveyor 20 to recommence loading magazine 19.

FIG. 5 demonstrates the kinematic operating principle behind the mechanism that controls the slewing movements of pushing plate 29 from pushing position A into withdrawal position B and vice-versa. It is proposed that the masses both of pushing plate 29 and of counterweight 33 be such, and so positioned relative to the slewing axis 35 of double-armed lever system 31 so positioned, that, when lever system 31 assumes mid-position C of the slewing angle α the total centre of gravity (mass centre point) S of such double-armed lever system 31 is situated exactly above slewing axis 35. In mid-position C, double-armed lever system 31 thus assumes an unstable equilibrium, from which pushing plate 29 is then able to tip of its own accord into one of either stable positions A or B, in which centre of gravity S takes up position S' or S" respectively. The redirection of pushing plate 29 thus requires only that the integral mass of such double-armed lever system 31 as concentrated at centre of gravity S be caused, by control impulses impinging, via stationary control paths 44, 45 upon guide rollers 34, to be shifted by the height difference h, whereafter pushing plate 29 slews back into either stable pushing position A or withdrawal position B.

The proposed design for a feed device operates as follows:

Wooden logs, whose individual transported length is approx. 2.5m, are transported from (not illustrated) conveyance systems to transverse conveyor 20, which transports such logs one by one into loading magazine 19. Inside the latter, the logs are, by means of suitable intervention of the directing-and-righting elements 23, 24, formed into compact, parallel log piles 25. As soon as loading magazine 19 has been filled to its optimal operating level, which, for example, can be signalled by means of an electronic light panel, transverse conveyor 20 is stopped and directing-and-righting elements 23, 24 withdrawn entirely from loading magazine 19. Meanwhile, pushing plate 29 has advanced the last section of the preceding log pile into flaking chamber 6, and is, following closure by sliding closer 18 of flaking chamber 6, swung back into its withdrawal position B to rapidly return to its starting position behind loading magazine 19.

At the end of the return trip, pushing plate 29 is again lowered by stationary control paths 45 into its pushing position A, in which it is able, by advancing again, to push the log pile 25, already prepared inside loading magazine 19, into feed trough 14 up to the stop at the forward end of such feed trough, sliding closer 18 being still in its closed condition. The halting point for the advance movement of pushing plate and log pile, which is created by the closure of sliding closer 18, marks for pushing plate 29 the starting point, from which the latter can then push, in cycles of uniform duration, log piles 25 into flaking chamber 6. Simultaneously, transverse conveyor 20 is signalled to resume filling loading magazine 19.

Following the advance of each section of log pile 25 into flaking chamber 6, both the hydraulic systems of pressure assembly 17, which presses down from the top, and sliding closer 18, which presses in from the side, are activated, and, after a predetermined pressure level has been reached, flaking machine 2 is caused to move in the direction indicated in FIG. 2 by the arrow, whereby the constantly rotating knife ring 5 is able to reduce to wood flakes the logs held in flaking chamber 6. Following this step, flaking machine 2 is quickly moved back into its starting position and, after pressure assembly 17 and sliding closer 18 have withdrawn their pressure, flaking chamber 6 is again fed with logs. After the last section has been fed from the log pile into the flaking chamber, sliding closer 18 is slid in front of flaking chamber 6 whereupon pushing plate 29 is immediately swung back into its withdrawal position B to quickly move back into its starting position behind the loading magazine.

While log pile 25 is being rendered into wood flakes, loading magazine 19 is again filled with the next log pile 25, in order to enable the operating cycle to recommence in the manner described above.

As has already been mentioned, the mode of functioning of the proposed feed device is not changed by the type of flaking machine it serves to feed with logs. In place of the knife-ring flaker described in the present application, a knife-head type flaker or a knife-disc flaker can be employed, whereby in the case of the latter example, the only modification to be made to the proposed feed device would be that of providing both pushing plate 29 and sliding closer 18 with a concave bulge corresponding to the radius of the knife-disc.

I claim:

1. A feed device for a wood flaking machine, comprising:
   a feed station comprising a feed trough having an inlet and an outlet; and
   a loading station having an inlet and an outlet, the outlet of the loading station being arranged behind the inlet of the feed station at the same height as the feed station and comprising a loading magazine, the loading magazine and the feed trough being arranged along a single longitudinal axis;
   stationary control paths arranged at the outlet of the feeding station and the inlet of the loading station; and
   a support bearing a pushing plate that is movable in both directions along the longitudinal axis through the feed trough and the loading magazine, the pushing plate comprising at least one guide member which interacts with the stationary control paths to move the pushing plate into different positions.

2. A device as claimed in claim 1, wherein the outlet of the feeding station is adjacent to a flaking chamber of a flaking machine.

3. A device as claimed in claim 2, wherein the support is parallel to a floor surface of the feed trough and loading magazine.

4. A device as claimed in claim 3, wherein the pushing plate is attached to a double-armed lever system comprising a slewing axle as a pivot point.

5. A device as claimed in claim 4, wherein a counterweight is attached to the double-armed lever system, the slewing axle being situated between the pushing plate and the counterweight.

6. A device as claimed in claim 5, wherein a control member is attached to the double-armed lever system on the same side of the slewing axle as the counterweight.

7. A device as claimed in claim 6, wherein the mass and position of the counterweight and the pushing plate are such that the double-armed lever system is in unstable equilibrium at the midpoint of its slewing angle.

8. A device as claimed in claim 7, wherein a first stationary control path is located on the feed trough laterally of the outlet of the feeding station and acts on the control member from above.

9. A device as claimed in claim 8, wherein a second stationary control path is located behind the loading magazine and acts on the control member from below.

10. A device as claimed in claim 9, wherein the control member comprises a guide roller located on a side of the counterweight.

11. A device as claimed in claim 10, additionally comprising a guide tongue which rides in cheeks attached to edges of the feed trough, wherein the first stationary control path comprises an underside of the guide tongue and wherein the guide rollers run on an upper side of the guide tongue.

12. A device as claimed in claim 1, wherein the support additionally comprises lateral guide rollers which ride in guide grooves located on both sides of the feed trough and on both sides of the loading magazine, the guide rollers and guide grooves preventing tilting of the support.

13. A device as claimed in claim 1, wherein the support is moved by synchronously-driven lengths of chain.

14. A device as claimed in claim 2, additionally comprising a sliding closer between the outlet of the feed trough and the inlet of the flaking chamber, the sliding closer being movable obliquely relative to the feed trough and the flaking chamber.

15. A device as claimed in claim 14, wherein the sliding closer is reinforced on a side facing the feed trough and has a sloping surface on a side that faces the flaking chamber.

16. A device as claimed in claim 15, wherein the sliding closer is suspended on track rollers and is laterally movable in a groove located on a floor of the flaking chamber.

17. A device as claimed in claim 16, wherein the reinforced side of the sliding closer has a concave shape.

* * * * *